US006582307B2

(12) United States Patent
Webb

(10) Patent No.: US 6,582,307 B2
(45) Date of Patent: Jun. 24, 2003

(54) GAMING DEVICE HAVING A SELECTION-TYPE BONUS GAME THAT ACTIVATES A MECHANICAL DEVICE

(75) Inventor: Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/960,788

(22) Filed: Sep. 21, 2001

(65) Prior Publication Data

US 2003/0060265 A1 Mar. 27, 2003

(51) Int. Cl.[7] .................................... G06F 17/00

(52) U.S. Cl. ............................ 463/22; 463/20; 463/25; 463/31

(58) Field of Search ............................ 463/20, 22, 25; 273/142 R, 143 R

(56) References Cited

U.S. PATENT DOCUMENTS

| | | | |
|---|---|---|---|
| 4,618,150 A | | 10/1986 | Kimura |
| 4,624,459 A | | 11/1986 | Kaufman |
| 4,695,053 A | | 9/1987 | Vazquez, Jr. et al. |
| 5,259,616 A | * | 11/1993 | Bergmann ................... 463/17 |
| 5,449,173 A | | 9/1995 | Thomas et al. |
| 5,560,603 A | | 10/1996 | Seelig et al. |
| 5,664,998 A | | 9/1997 | Seelig et al. |
| 5,766,074 A | | 6/1998 | Cannon et al. |
| 5,769,716 A | | 6/1998 | Saffari et al. |
| 5,779,544 A | | 7/1998 | Seelig et al. |
| 5,788,573 A | | 8/1998 | Baerlocher et al. |
| 5,823,874 A | | 10/1998 | Adams |
| 5,848,932 A | | 12/1998 | Adams |
| 5,851,148 A | | 12/1998 | Brune et al. |
| 5,882,261 A | | 3/1999 | Adams |
| 5,890,962 A | | 4/1999 | Takemoto |
| 5,911,418 A | | 6/1999 | Adams |
| 5,919,088 A | | 7/1999 | Weiss |
| 5,947,820 A | | 9/1999 | Morro et al. |
| 5,951,397 A | | 9/1999 | Dickinson |
| 5,980,384 A | | 11/1999 | Barrie |
| 5,997,400 A | | 12/1999 | Seelig et al. |
| 6,004,207 A | | 12/1999 | Wilson, Jr. et al. |
| 6,015,346 A | | 1/2000 | Bennett |
| 6,033,307 A | | 3/2000 | Vancura |
| 6,059,289 A | | 5/2000 | Vancura |
| 6,059,658 A | | 5/2000 | Mangano et al. |

(List continued on next page.)

FOREIGN PATENT DOCUMENTS

| | | |
|---|---|---|
| EP | 0874337 A1 | 10/1998 |
| EP | 0945837 A2 | 9/1999 |
| EP | 0984409 A2 | 3/2000 |

OTHER PUBLICATIONS

Mayan Wheel of Gold Article written by Strictly Slots, published prior to 2001.

Instant Slotto article written by Strictly Slots, published Apr. 2001.

Jackpot Party Brochures and Articles written by WMS Gaming, Inc., published 1998.

(List continued on next page.)

*Primary Examiner*—S. Thomas Hughes
*Assistant Examiner*—Corbett B Coburn
(74) *Attorney, Agent, or Firm*—Bell, Boyd & Lloyd LLC

(57) ABSTRACT

The present invention provides a gaming device having a bonus game wherein a mechanical device activates simultaneously with or immediately upon a player picking a selection having a terminator which ends a selection portion of the bonus game. The bonus game provides a player with a number of masked selections displayed on a display device. Each selection has an associated award and at least one selection has an associated terminator. The game enables the player to pick selections and accumulate a preliminary bonus award until picking a selection having a terminator. When the player picks a selection revealing a terminator, the processor simultaneously or immediately thereafter activates the mechanical device and after a period of time causes the mechanical device to display a modifier to the player which modifies the preliminary bonus award, thus determining the player's final bonus award.

29 Claims, 8 Drawing Sheets

U.S. PATENT DOCUMENTS

| | | | |
|---|---|---|---|
| 6,062,980 A | | 5/2000 | Luciano |
| 6,089,976 A | | 7/2000 | Schneider et al. |
| 6,089,978 A | | 7/2000 | Adams |
| 6,102,798 A | | 8/2000 | Bennett |
| 6,105,962 A | | 8/2000 | Malavazos et al. |
| 6,113,098 A | | 9/2000 | Adams |
| 6,120,031 A | | 9/2000 | Adams |
| 6,126,542 A | | 10/2000 | Fier |
| 6,135,884 A | | 10/2000 | Hedrick et al. |
| 6,142,873 A | | 11/2000 | Weiss et al. |
| 6,158,741 A | | 12/2000 | Koelling |
| 6,159,095 A | | 12/2000 | Frohm et al. |
| 6,159,098 A | | 12/2000 | Slomiany et al. |
| 6,162,121 A | | 12/2000 | Morro et al. |
| 6,168,520 B1 | | 1/2001 | Baerlocher et al. |
| 6,173,955 B1 | | 1/2001 | Perrie et al. |
| 6,174,235 B1 | | 1/2001 | Walker et al. |
| 6,190,255 B1 | | 2/2001 | Thomas et al. |
| 6,224,483 B1 | | 5/2001 | Mayeroff |
| 6,227,969 B1 | | 5/2001 | Yoseloff |
| 6,231,442 B1 | | 5/2001 | Mayeroff |
| 6,261,177 B1 | | 7/2001 | Bennett |
| 6,270,411 B1 | | 8/2001 | Gura et al. |
| 6,302,790 B1 | | 10/2001 | Brossard |
| 6,305,686 B1 | | 10/2001 | Perrie et al. |
| 6,309,300 B1 | | 10/2001 | Glavich |
| 6,315,660 B1 | | 11/2001 | DeMar et al. |
| 6,315,664 B1 | | 11/2001 | Baerlocher et al. |
| 6,328,649 B1 | | 12/2001 | Randall et al. |
| 6,334,814 B1 | | 1/2002 | Adams |
| 6,336,863 B1 | | 1/2002 | Baerlocher et al. |
| 6,338,678 B1 | * | 1/2002 | Seelig et al. .................. 463/17 |
| 6,450,884 B1 | * | 9/2002 | Seelig et al. .................. 463/17 |

OTHER PUBLICATIONS

The Price is Right—Showcase Showdown written by IGT, published date not known.

Pink Panther Advertisement and Article written by IGT, published 2000.

Wheel of Fortune Advertisement written by IGT, published in 1999.

Frog Prince Article written Strictly Slots, published in Jun. 2001.

Frog Prince Advertisements written by IGT, published in 2001.

Gold Fever Game Description written by Atronic GmbH, available prior to 2001, printed Mar. 12, 2002.

* cited by examiner

GAMING DEVICE HAVING A SELECTION-TYPE BONUS GAME THAT ACTIVATES A MECHANICAL DEVICE

CROSS REFERENCES TO RELATED APPLICATIONS

This application relates to the following co-pending commonly owned patent applications: "GAMING DEVICE HAVING A BONUS SCHEME WITH MULTIPLE SELECTION GROUPS," Ser. No. 09/656,702, "GAMING DEVICE WITH BONUS SCHEME PROVIDING INCREASED REWARD FOR SELECTING RELATED SYMBOLS," Ser. No. 09/605,023, "GAMING DEVICE HAVING MULTIPLE CHOICE LARGE AWARD BONUS SCHEME," Ser. No. 09/686,284, "GAMING DEVICE HAVING VALUE SELECTION BONUS," Ser. No. 09/684,605, "GAMING DEVICE HAVING RELATED MULTIGAME BONUS SCHEME," Ser. No. 09/688,972"GAMING DEVICE HAVING AN INDICATOR SELECTION WITH PROBABILITY-BASED OUTCOME BONUS SCHEME," Ser. No. 09/981,163, "GAMING DEVICE HAVING A BONUS SCHEME INCLUDING A PLURALITY OF SELECTION GROUPS WITH WIN-GROUP OUTCOMES", Ser. No. 09/981,084, "GAMING DEVICE HAVING A MULTIPLE SELECTION AND AWARD DISTRIBUTION BONUS SCHEME," Ser. No. 09/688,635, "GAMING DEVICE HAVING AN ORDERED DESIGNATION OF BONUS VALUES IN MULTIPLE VALUE SETS," Ser. No. 09/978,913, "GAMING DEVICE HAVING A BONUS SCHEME WITH MULTIPLE POTENTIAL AWARD SETS," Ser. No. 09/822,697, "GAMING DEVICE HAVING AN INDICATOR SELECTION WITH PROBABILITY-BASED OUTCOME," Ser. No. 09/990,693, "GAMING DEVICE WITH SIGNIFIED SYMBOLS," Ser. No. 09/990,484.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly a gaming device having a bonus game wherein the gaming device enables a player to pick selections until picking a selection having a terminator, whereupon the processor of the gaming device activates a mechanical device to determine the final bonus award.

BACKGROUND OF THE INVENTION

Gaming devices, such as slot machines, having primary and secondary games are well known. One well known bonus game provides the player with an opportunity to win a bonus award by choosing one or more symbols from a group of symbols or one or more selections from a group of selections. The symbols are usually images that relate to a theme of the base game. The symbols mask awards from the player.

In one known implementation, the player picks from a group of symbols until the player picks a symbol that has been designated to terminate the bonus game, commonly referred to as a "terminator" or "pooper" and often represented by the term "COLLECT." When the player obtains a terminator, the game provides the player the award associated with the selections picked prior to picking the terminator. Examples of this type of bonus game are disclosed in U.S. Pat. No. 6,190,255 and EP 0 945 837 A2. Another example disclosed in EP 0 874 337 A1 enables the player to spin the reels of the gaming device until a non-winning combination is landed upon.

A second type of known bonus game provides a player a number of picks. A pick, for example, may be a pick from a group of masked selections, unmasked selections, or may include spinning the base game reels. An award may or may not be associated with each pick. When the player uses all of the player's picks, the accumulated awards for all of the picks are provided to the player as the final bonus award and the bonus game is terminated. An example of this type of bonus game is disclosed in EP 0 984 409 A2.

A third type of known bonus game includes a mechanical apparatus such as a wheel or reel attached to a gaming device which provides a bonus award. Similar to other bonus games, a predetermined qualifying or triggering event in the base game triggers the bonus game. One example of a mechanical device which provides a bonus award to the player is in the SLOTTO™ gaming device distributed by A.C. Coin and Slot Service Co. The SLOTTO™ gaming device includes a lottery type apparatus mounted on top of the gaming device cabinet. The apparatus includes a plurality of plastic balls inside a globe. Each ball includes an award marked thereon. The game randomly displays a ball to the player. The award marked on the displayed ball indicates the player's bonus award.

Traditional end-bonus, terminator, or pooper games determine a players final bonus award by summing selections until a terminator is obtained. Other bonus games determine the final bonus award by summing awards associated with selections picked by a player until the player uses a number of picks. Traditional mechanical bonus games display or determine the final bonus award by performing a mechanical operation absent player participation. While these final bonus award determination methods are successful, new exciting methods of determining final bonus awards are desired to provide player enjoyment, excitement and entertainment.

SUMMARY OF THE INVENTION

The present invention provides a gaming device having a bonus game wherein a mechanical device activates simultaneously with or immediately upon a player picking a selection having a terminator which ends the selection portion of the bonus game. More specifically, one embodiment of the present invention provides a processor controlled bonus game that provides a player a number of masked selections displayed on a display device. At least one and preferably a plurality of selections have an associated award and at least one selection has an associated terminator. The game enables the player to pick selections and accumulate a preliminary bonus award until picking a selection having a terminator. When the player picks a selection revealing a terminator, the processor simultaneously or immediately thereafter activates the mechanical device and after a period of time causes the mechanical device to display a modifier to the player which modifies the preliminary bonus award, thus determining the player's final bonus award. In one embodiment, the mechanical device does not include player interaction, but it should be appreciated that the mechanical device could include player interaction.

In one embodiment, the player selection stage includes a plurality of selections displayed on a display device. The selections may include any symbol, image, indicia or icon which reflects the theme of the particular game. The game enables the player to pick selections until picking a selection revealing a terminator. For each non-terminator selection picked, the game reveals an award associated with the selection. The preliminary bonus award consists of, in one embodiment, the sum of all the awards associated with selections picked by the player prior to picking the selection revealing a terminator. When a player picks a selection revealing a terminator, the processor activates the mechanical device of the bonus game.

The mechanical device could be any suitable device capable of displaying a modifier such as one or more reels, one or more wheels, or any other type of device or apparatus which is preferably attached to the cabinet of the gaming device. One embodiment of the mechanical device is similar to a lottery globe including a plurality of plastic balls having modifiers thereon. When activated, the plastic balls randomly move inside the globe and a plastic ball marked with a modifier is displayed to the player. The processor applies the modifier marked on the ball to the preliminary bonus award to determine the player's final bonus award. One advantage of this game is it enables a player to participate in a bonus game by picking selections until picking a selection having a terminator, and ultimately having a mechanical device determine the player's final bonus award.

It is therefore an advantage of the present invention to provide a gaming device having a bonus game with a terminator that activates a mechanical device to determine the player's final bonus award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
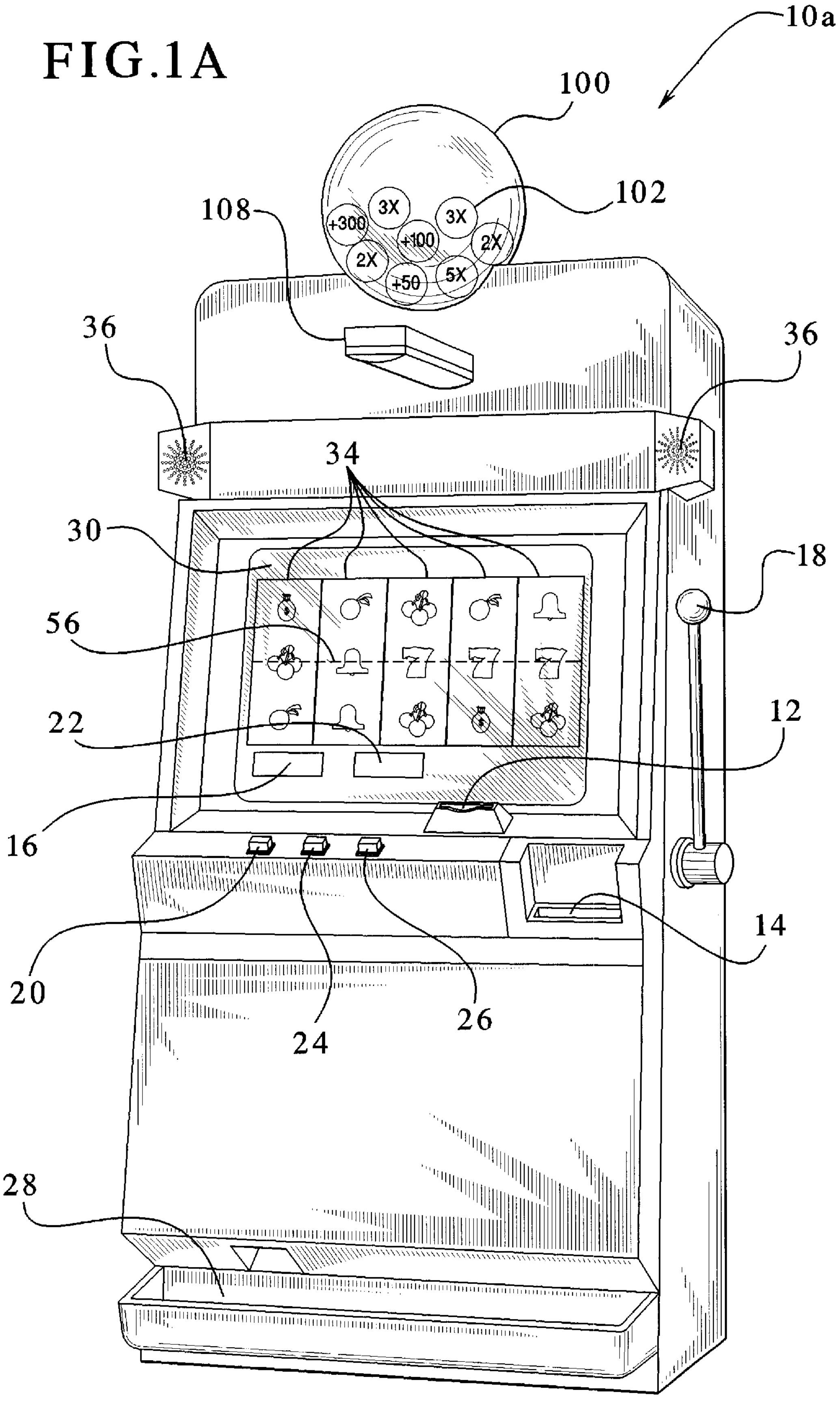
FIGS. 1A and 1B illustrate perspective views of alternative embodiments of the gaming device of the present invention.
Figure 1B:
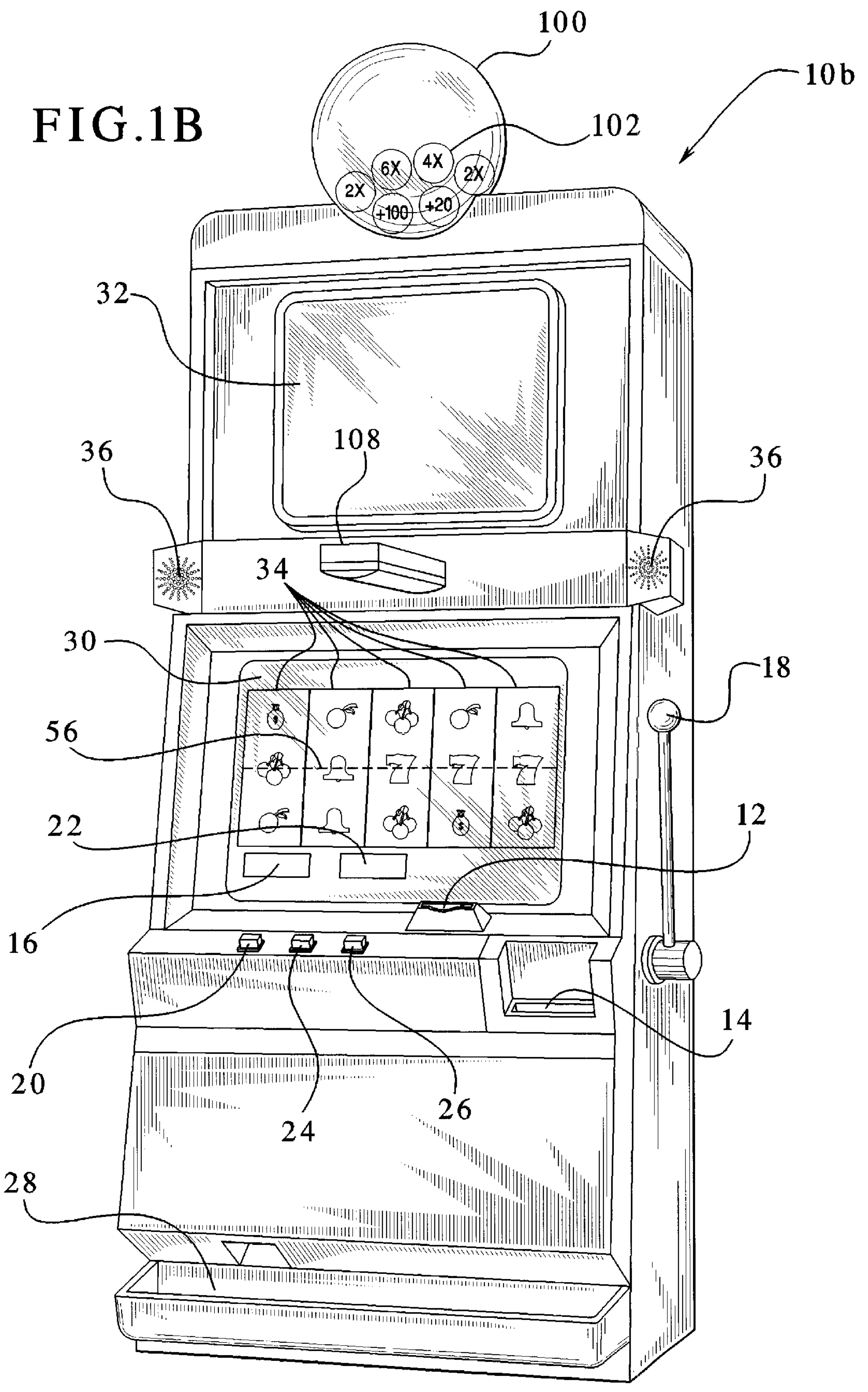

Referring now to the drawings, and in particular to FIGS. 1A and 1B, gaming device 10*a* and gaming device 10*b* illustrate two possible cabinet styles and display arrangements of the present invention and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base or progressive games include mechanical, electrical or video symbols and indicia.

The gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

FIGS. 1A and 1B further show gaming device 10 with a mechanical device including a spherical housing 100 containing a plurality of movable objects 102, an object window 108 for displaying a moveable object to the player, and a mechanical object dispenser 110 connected to the object window 108 (as shown in FIGS. 5A and 5B and described in more detail below) for displaying an object having an award modifier marked thereon to the player as further described below. This mechanical device is adapted to be activated as part of the bonus game of the present invention as further described below. It should be appreciated that any suitable mechanical device may be used to provide an award modifier to the player and that the spherical housing, moveable object, and object dispenser are illustrated to demonstrate that the mechanical device can have multiple components.

Figure 2:
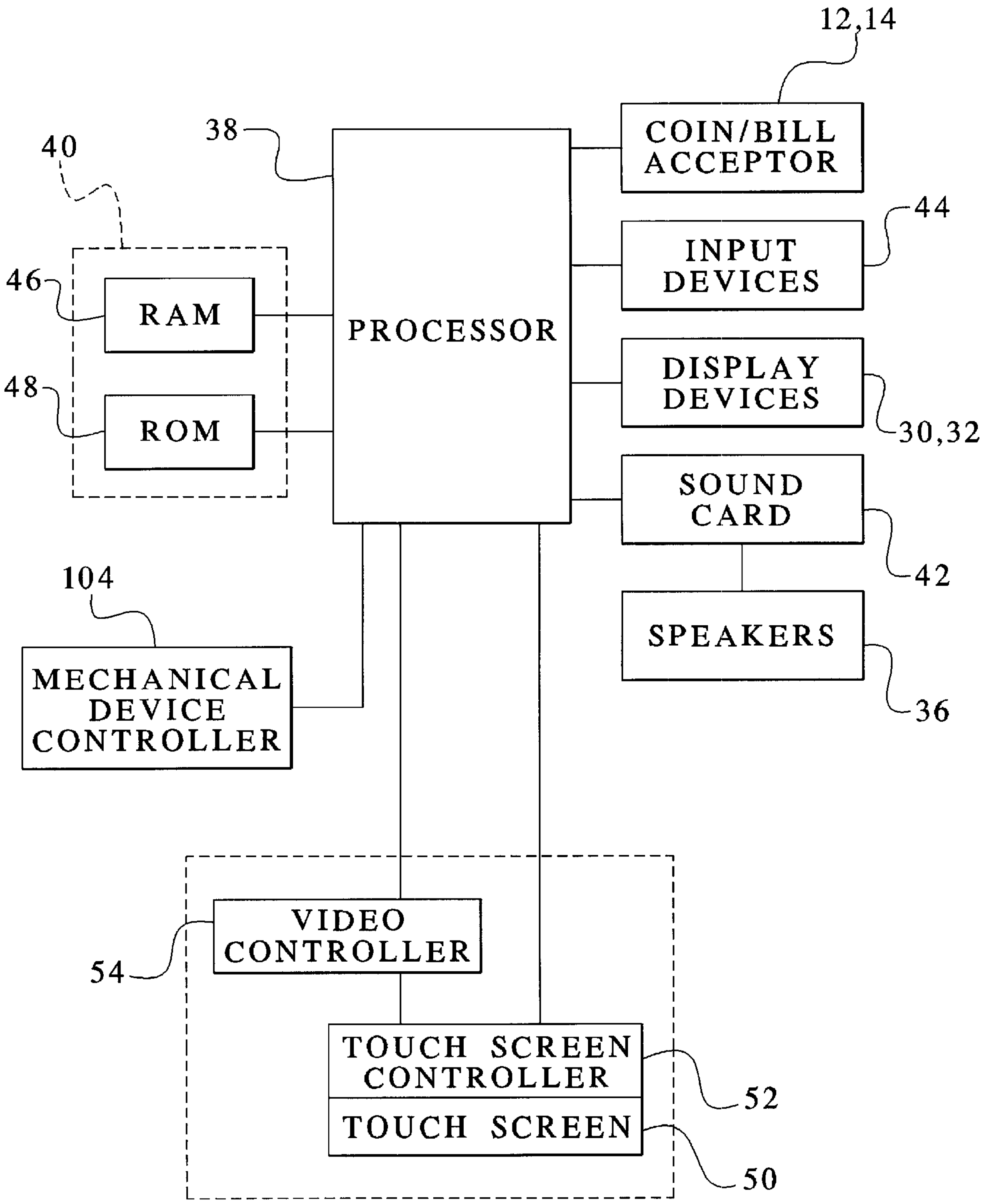
FIG. 2 is a schematic block diagram of the electronic configuration of one embodiment of the gaming device of the present invention.
Figure 5:
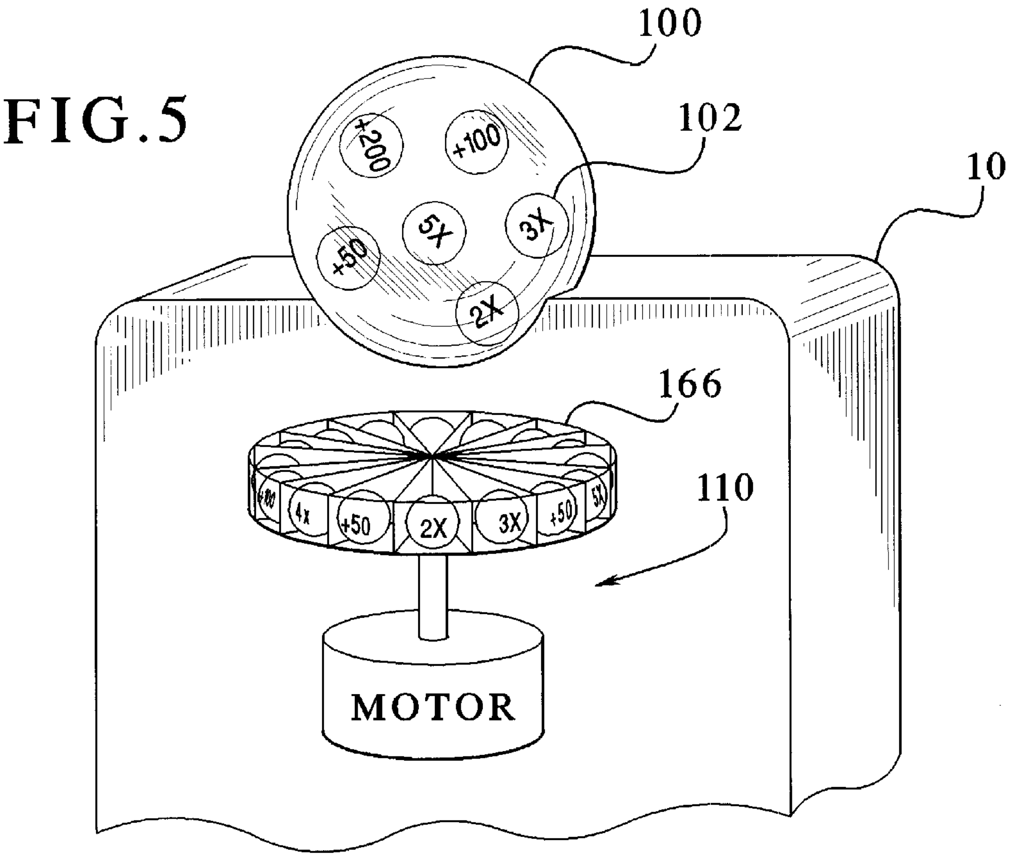
FIG. 5 is a fragmentary front elevation view of the upper portion of the gaming device of FIG. 4 with the front panel removed revealing the mechanical object dispenser.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; a mechanical device controller 104; and one or more input devices 44. The processor 38 is preferably a microprocessor or micro-controller-based platform which is capable of displaying images, symbols and other indicia such as images of people, characters, places, things and faces of cards. In addition, the processor 38 communicates with said mechanical device controller 104. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables. In the illustrated embodiment of FIGS. 1A and 1B, the mechanical device controller 104 controls a blower motor which circulates air into the container at high velocities to cause the moveable objects 102 to randomly move. The mechanical device controller 104 also controls the mechanical object dispenser 110, which includes a stepper motor which rotates a multiple chambered wheel 166 having a plurality of modifier objects 148 as illustrated in FIG. 5 and described below. This embodiment illustrates that the mechanical device employed in the present invention can include one or more mechanical sub-devices, controlled by one or more controllers, which co-act to display a modifier to the player. It should be appreciated that other suitable mechanical devices can be employed in conjunction with the present invention to display such modifier to the player.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Bonus Game

Generally, when the base game of the present invention achieves a triggering event, the gaming device initiates a bonus game and enables the player to pick selections from a plurality of selections until picking a selection revealing a terminator. The game displays a plurality or group of selections on the display device for the player to pick from. In one embodiment, the display device of the present invention includes a selector such as a touch screen which enables the player to pick selections by physically touching the touch screen in the area of a selection. The selector alternatively can be one or more mechanical devices connected to the controller. In the preferred embodiment, the selections are images displayed by the display device. In a simple embodiment, there are two selections. An award is associated with one selection and a terminator is associated with the other selection. A preferred embodiment includes a plurality of selections, at least one terminator associated with at least one of the selections, and an award associated with each of the other selections. It should be appreciated that an award may only be associated with one or more selections and a terminator may be associated with more than one selection.

In one embodiment, each time the game is initiated the processor randomly assigns awards to the selections. Alternatively, the processor may assign the awards to the order of picks the player makes, wherein the specific selections picked by the player do not determine the awards. Further, the bonus game initiation process includes randomly determining the association of the terminator(s). The game may thus physically or temporally associate the terminator. Physical association is accomplished by randomly determining which selection(s) of the group of selections, when picked, reveals a terminator. The processor accomplishes temporal association by randomly determining a number of picks the player gets before revealing the terminator. In one embodiment, to ensure that the player receives a bonus award, the terminator is not revealed with the first pick.

Figure 3:
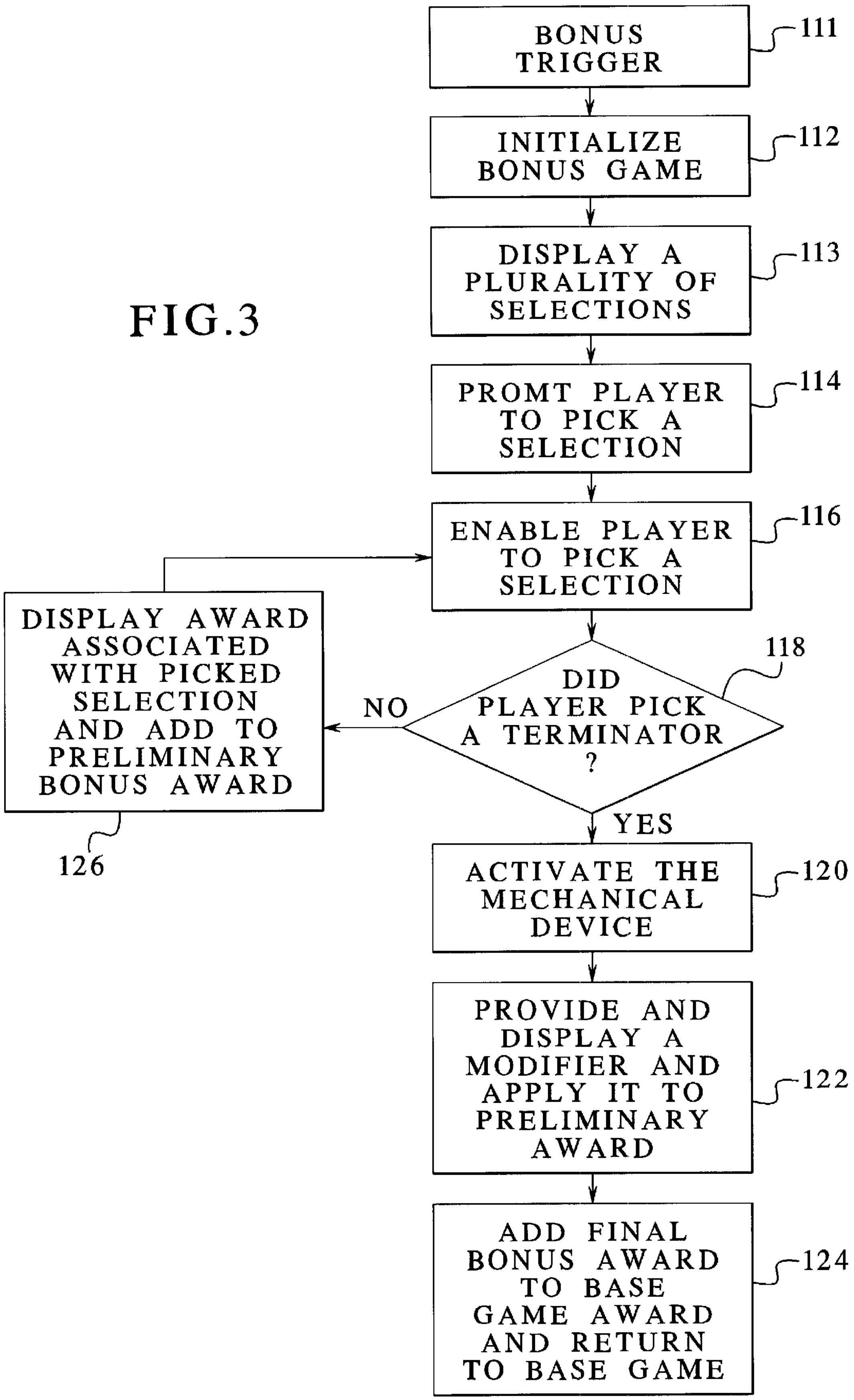
FIG. 3 is a flow diagram illustrating one method of the present invention.

Referring now to FIG. 3, a triggering event occurs in the base game which triggers the bonus game as indicated by block 111. After triggering the bonus game, the game initializes the player selection stage as indicated by block 112, displays a plurality or group of selections on the display device 30 or 32 as indicated by block 113, and prompts the player to pick a selection as indicated by block 114. The game enables the player to pick one selection from the group of selections as indicated by block 116. The game then reveals whether the player picked a terminator selection as indicated by diamond 118. In another embodiment, the processor randomly predetermines how may picks the player gets before revealing the terminator, thus the condition of block 118 would be whether or not the pick is the player's last pick.

If the picked selection does not reveal a terminator, the game displays an award and adds it to the preliminary bonus award, as indicated by block 126. The above process is repeated until a player picks a selection revealing a terminator. Each award associated with each selection is randomly determined by the processor, either during initialization of the bonus game or simultaneously with the player's selection. In one embodiment, the award values increase as the player advances through the bonus game without picking a selection revealing a terminator.

When a selection reveals a terminator, the processor simultaneously with revealing the terminator or immediately thereafter activates a mechanical device, as indicated by block 120. In one alternative embodiment, the gaming device includes a clock for creating a delay period or count-down between the time the player picks a selection revealing a terminator and the mechanical device activates. This may add excitement to the game. In either embodiment however, the mechanical device after a period of time of performing its mechanical function displays or provides a modifier to the player adapted by the processor to modify the preliminary bonus award to determine the player's final bonus award as indicated by block 122. Finally, the processor adds the final bonus award to the player's base game award (or player's credits) and enables the player to continue with the base game as indicated in block 124. Although the modifier may be any suitable value or award, preferably it is one of a plurality of values or multipliers.

Figure 4:
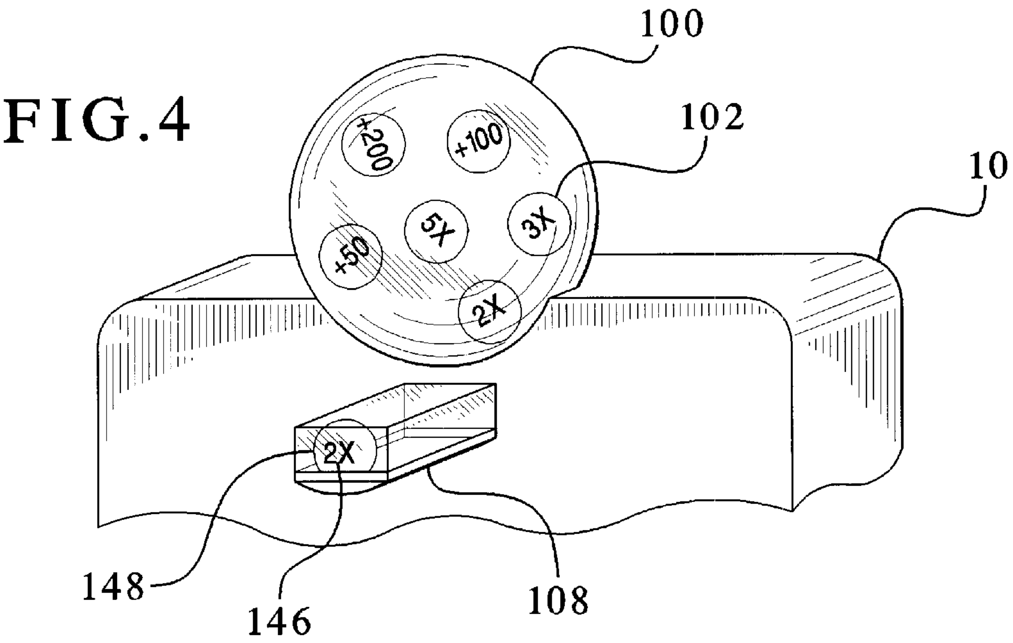
FIG. 4 is a fragmentary front elevation view of the upper portion of a gaming device having a mechanical device in the form of a container including a plurality of moveable objects and a window for displaying a modifier to the player.

Referring now to FIG. 4, the primary embodiment of the mechanical device of the present invention is shown mounted in the top portion of the housing of a gaming device 10. This mechanical device is a lotto-type device and includes a glass or plastic transparent spherical housing 100 attached to the cabinet of the gaming device 10. The housing contains a plurality of moveable objects 102 which are lightweight plastic balls. Each of the lightweight plastic balls have modifiers marked thereon and are readable by the player. This mechanical device includes an air blower for circulating air in the housing 100 causing the moveable objects 102 to randomly move.

The mechanical device illustrated also includes an object window 108 adapted to display a modifier object 148 from an object dispensing device 110. FIG. 5 illustrates one embodiment of an object dispensing device 110 adapted to randomly display modifier objects 148 in the object window 108 for the player to view. Each modifier object 148 has a modifier value 146 thereon adapted by the processor to modify the preliminary bonus award to determine the player's final bonus award. After the player views the modifier object 148, the object dispensing device 110 removes the modifier object 108 from the object window 108.

Figure 6A:
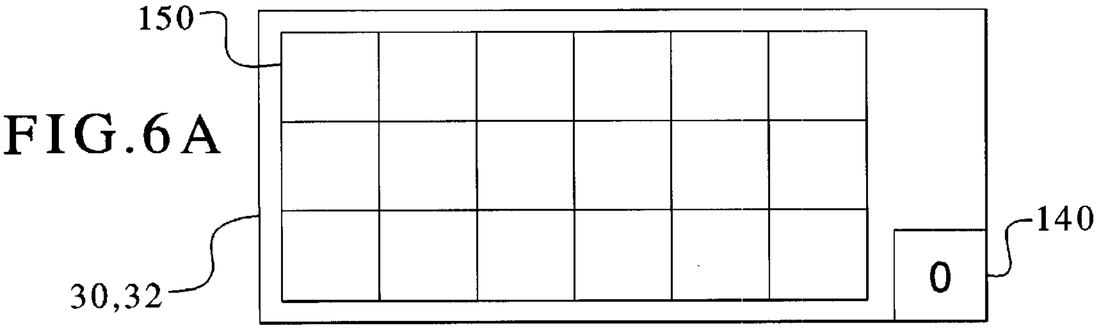
FIGS. 6A, 6B, 6C, and 6D are diagrammatic views of a display on a display device of one embodiment of the present invention having a plurality of selections masking a plurality of awards and one terminator.
Figure 6B:
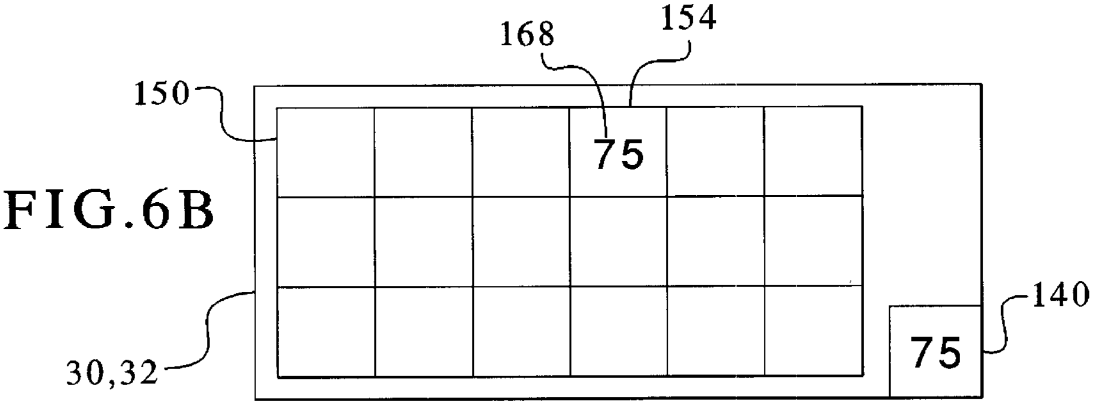

FIGS. 6A to 6D and 7A to 7C illustrate an example of the primary embodiment of the present invention. More specifically, FIGS. 6A to 6D show the display device 30 or 32 displaying a group of selections 150 and an award meter 140. The game prompts the player to pick a selection from the group of selections 150. FIG. 6B illustrates that the first selection 154 picked by the player does not reveal a terminator and it has an associated award 168 of seventy-five credits. The game displays the award 168 and adds it to the award meter 140. Selection 154 does not reveal a terminator and the game prompts the player to pick again.

Figure 6C:
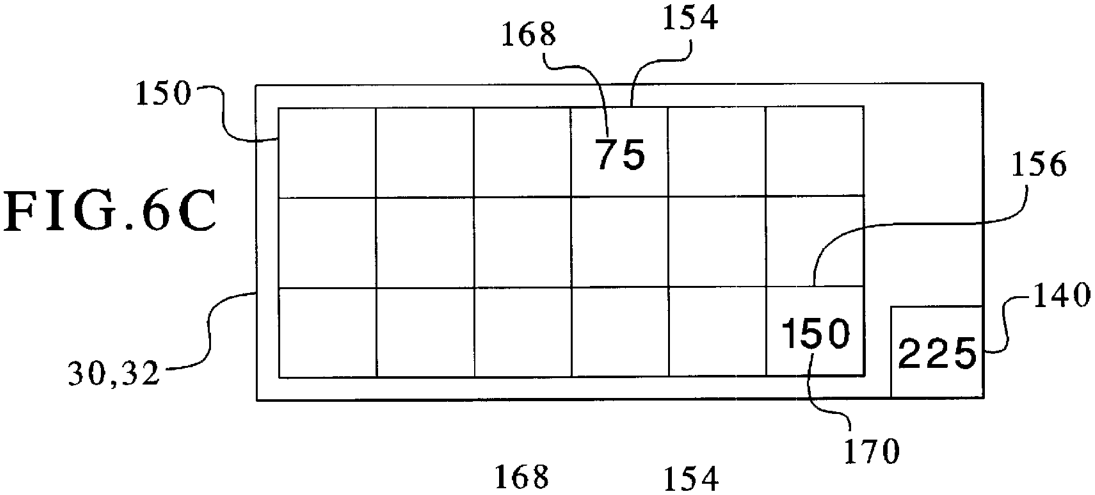

FIG. 6C illustrates that the second selection 156 picked by the player is not the terminator. The game displays the selection's 156 associated award 170 of one-hundred fifty credits and adds it to the award meter 140. The game then prompts the player to pick again.

Figure 6D:
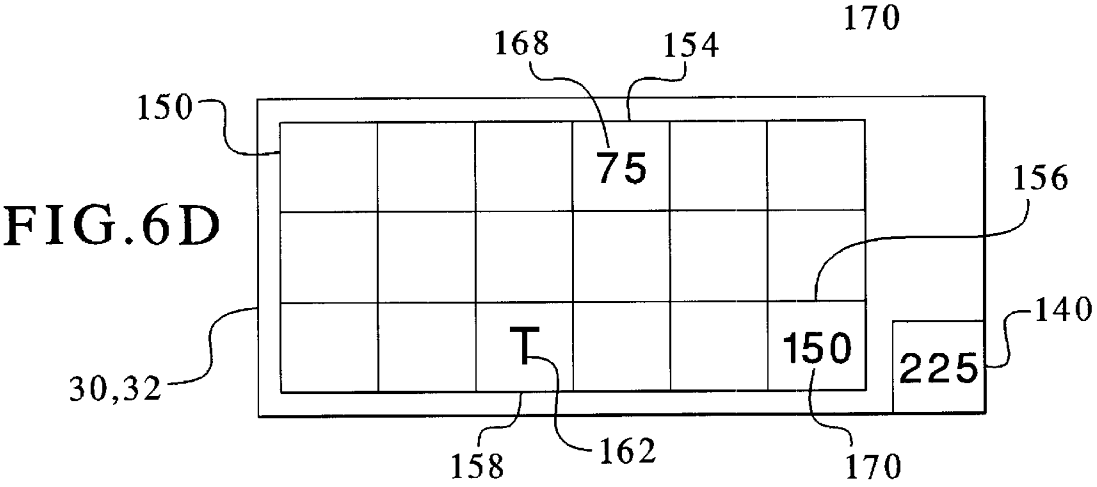

FIG. 6D reveals that the third selection 158 picked by the player reveals the terminator, represented by a terminator symbol 162. In one embodiment, there is no award associated with the terminator. The processor activates the mechanical device immediately subsequent to revealing the terminator symbol 162.

Figure 7A:
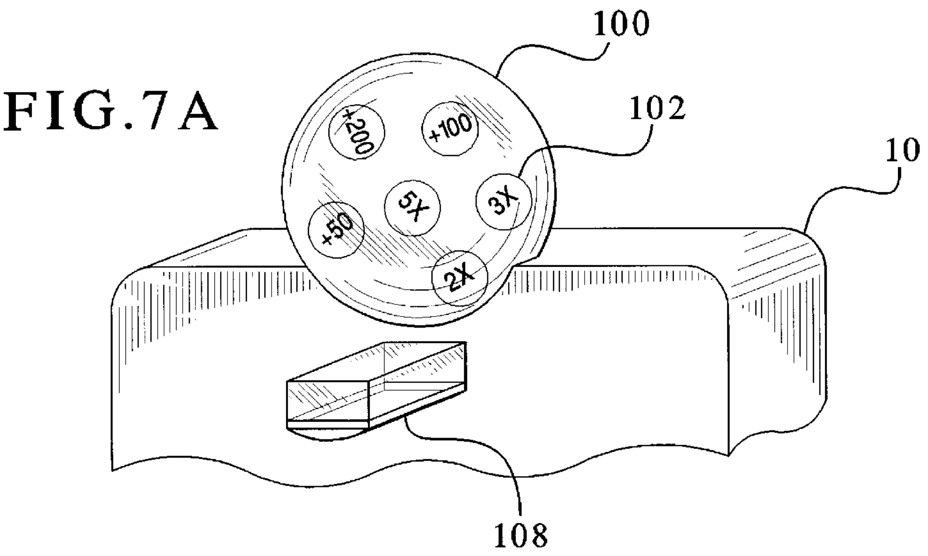
FIGS. 7A, 7B, and 7C are fragmentary front elevations of the upper portion of a gaming device having a mechanical device in the form of a container including a plurality of moveable objects, wherein the three figures together represent the cycle of the mechanical device portion of one embodiment of the present invention.
Figure 7B:
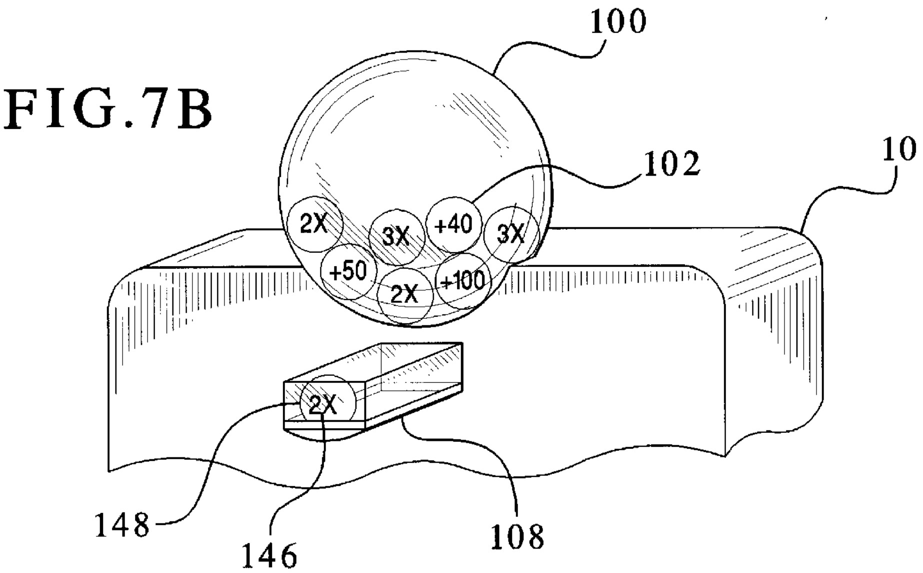
Figure 7C:
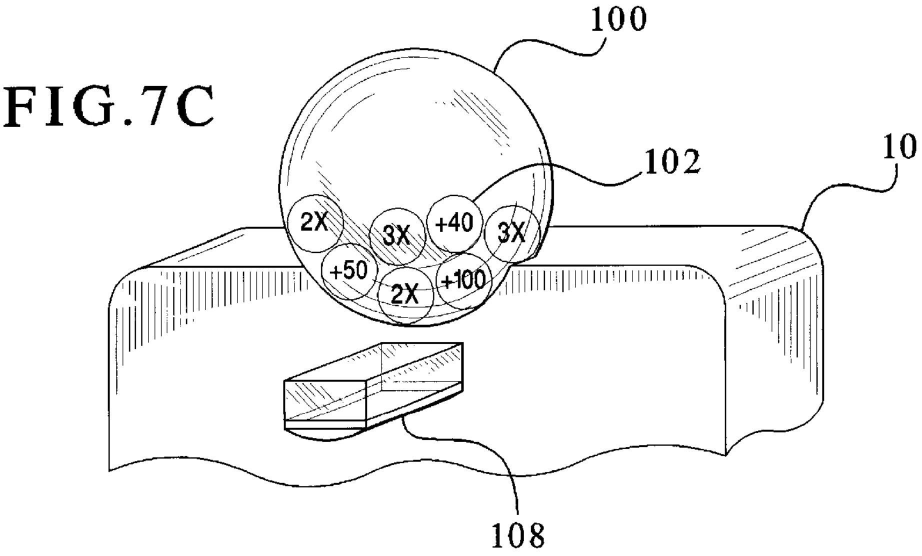

FIGS. 7A, 7B, and 7C illustrate one embodiment of the mechanical device activated subsequent to revealing the terminator symbol 162. FIG. 7A illustrates the fluctuation of the moveable objects 102 within the transparent spherical container 100. FIG. 7B illustrates the mechanical object dispenser displaying a modifier object 148 having a modifier 146 marked thereon to the player in the object window 108. FIG. 7C illustrates that the mechanical object dispenser retracts the modifier object 148 from the object window 108 and the moveable objects 102 in the container 100 settle, indicating the termination of the bonus game.

Figure 8:
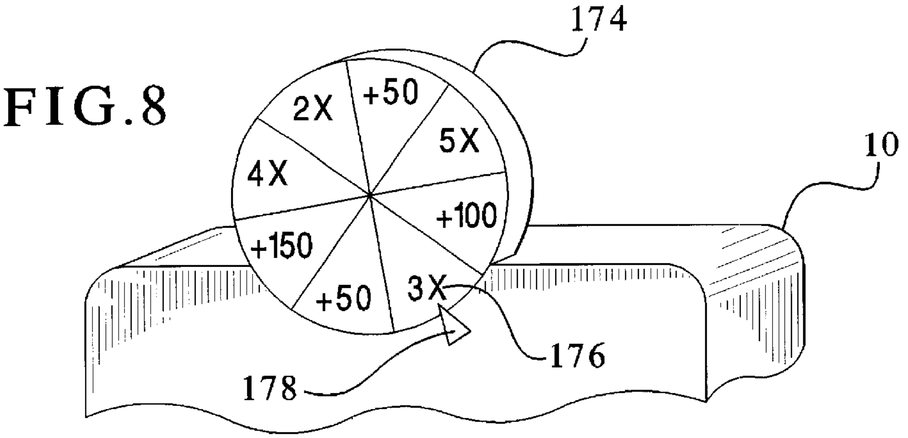
FIG. 8 is a fragmentary front elevation view of the upper portion of an alternative embodiment of the gaming device, wherein the mechanical device is a wheel.

As indicated above, the mechanical device may be any suitable mechanical device which displays or indicates the plurality of possible modifiers to the player. FIG. 8 illustrates an alternative embodiment of the gaming device having a mechanical device which includes a modifier wheel 174 attached to the top of the cabinet of the gaming device 10. The processor immediately activates or spins the modifier wheel 174 for a period of time upon a player picking a selection revealing a terminator. The modifier wheel 174 slows to a stop and an indicator 178 indicates to the player the player's modifier "3x" indicated by the numeral 176. The processor applies the modifier to the preliminary bonus award to determine the player's final bonus award.

Alternative Embodiments

It should be appreciated that in one alternative embodiment of the present invention, the processor does not need to activate the mechanical device every time a player picks a selection revealing a terminator. In one embodiment, the processor activates the mechanical device when the player picks a terminator selection according to a predetermined probability stored in the gaming device's memory. In another embodiment, activation of the mechanical device depends upon the number of picks the player has made prior to picking a selection revealing a terminator, (i.e., less than a maximum number or greater than a minimum number). It should also be appreciated that activation of the mechanical device may depend upon the amount of the player's preliminary bonus award prior to the player picking a selection revealing a terminator, (i.e., less than a maximum amount or greater than a minimum amount).

Further, a bonus game having multiple terminators may only activate the mechanical device upon the player picking a particular terminator or each terminator may activate the mechanical device one or more times. More specifically, the primary embodiment may include two terminators, T1 and T2. When a player picks a selection revealing T1, the mechanical device activates once and one modifier is displayed to the player. The processor applies this modifier to the preliminary bonus award to determine the player's final bonus award. However, when a player picks a selection revealing T2, the mechanical device activates twice, each time displaying a modifier to the player. The processor applies the first modifier to the preliminary bonus award and the second modifier to the already modified preliminary bonus award to determine the player's final bonus award.

Figure 9A:
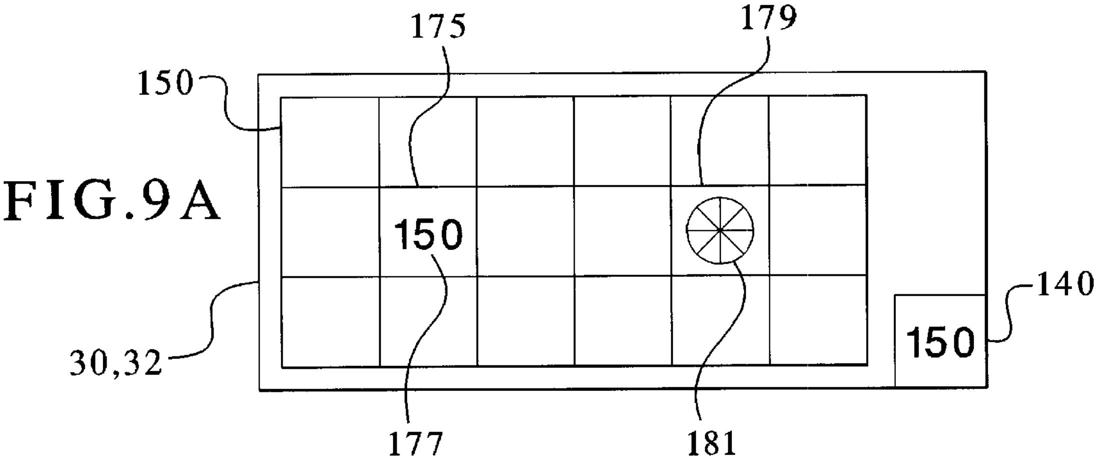
FIG. 9A is a diagrammatic view of a display on a display device having a plurality of selections masking a plurality of awards and multiple terminators, wherein one award and one terminator are revealed to the player.
Figure 9B:
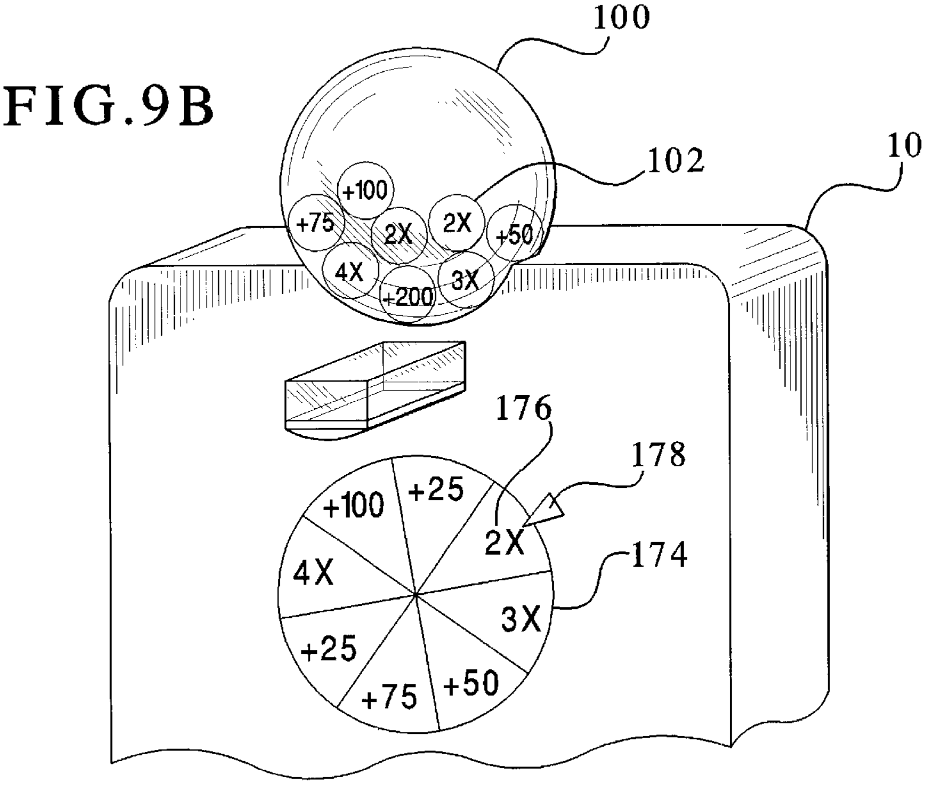
FIG. 9B is a fragmentary front elevation view of the upper portion of an alternative embodiment of the gaming device having two mechanical devices.

It should also be appreciated that other embodiments may include multiple mechanical devices. For example, one embodiment includes one modifier wheel and one lottery-type globe. In this embodiment, the game includes one or more terminators, wherein a picked selection revealing a terminator activates one or both of the mechanical devices. FIGS. 9A and 9B illustrate one embodiment, wherein a specific terminator activates a lottery-type device 100 and another terminator activates the modifier wheel 174. FIG. 9A illustrates that the player's first selection reveals an award 177 of one hundred fifty credits. The award meter 140 displays this award. FIG. 9A further illustrates that the player's second selection 179 reveals a terminator symbol 181. Since this embodiment includes two different mechanical devices, the revealed terminator indicates a particular device, in this case the modifier wheel 174. FIG. 9B illustrates that the modifier wheel 174 stopped on the modifier "2x" indicated by the numeral 176 as indicated by the indicator 178. The processor is adapted to modify the player's preliminary bonus award, which is one hundred fifty in this example, by "2x" to determine the player's final bonus award.

In another embodiment, the gaming device includes a mechanical selector connected to the processor such that when the player picks a selection revealing a terminator, the game enables the player to use the selector to pick which mechanical device to activate. In a similar embodiment, after the player picks a selection revealing a terminator the game requires said player to use said selector to activate said mechanical device.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

What is claimed is:

1. A gaming device comprising:

a housing;

a display device mounted in said housing and controlled by a processor;

a bonus game having a plurality of selections displayed by said display device;

a plurality of awards associated with said plurality of selections;

a terminator associated with at least one of said selections;

a selector in communication with said processor for enabling a player to pick said selections until picking a selection with an associated terminator;

a mechanical device connected to said housing and controlled by said processor, said mechanical device activated by said processor after said player picks a selection with an associated terminator; and a plurality of modifiers, wherein said mechanical device is adapted to display one said plurality of modifiers to said player.

2. The gaming device of claim 1, which includes a plurality of mechanical devices connected to said housing and controlled by said processor.

3. The gaming device of claim 2, which includes a selector connected to said processor which enables said player to pick one of said plurality of mechanical devices to display said modifier.

4. The gaming device of claim 3, wherein said selector is a mechanical selector.

5. The gaming device of claim 2, which includes a plurality of terminators randomly associated with said plurality of selections.

6. The gaming device of claim 5, wherein each of said plurality of terminators communicate with said processor to activate different mechanical devices.

7. The gaming device of claim 1, wherein the mechanical device includes multiple mechanical sub-devices which co-act to display said modifier to said player.

8. The gaming device of claim 1, which includes a probability associated with said terminator, wherein the processor randomly determines to activate said mechanical device based on said probability.

9. The gaming device of claim 1, wherein said mechanical device activates immediately subsequent to said player picking a selection associated with a terminator.

10. The gaming device of claim 1, which includes a delay period between the player picking a selection associated with a terminator and said mechanical device activation.

11. The gaming device of claim 1, which includes a selector connected to said processor, wherein after said player picks a selection revealing a terminator, said selector enables said player to use said selector to activate said mechanical device.

12. The gaming device of claim 1, wherein said modifier displayed by said mechanical device to said player is determined by said processor.

13. The gaming device of claim 1, wherein a total award provided to the player includes a sum of the awards associated with the selections picked by the player prior to the player picking the selection with an associated terminator which is modified by the modifier displayed to the player by the mechanical device.

14. The gaming device of claim 1, wherein the modifier displayed to the player modifies at least one of the awards associated with the selections picked by the player.

15. The gaming device of claim 1, wherein the modifier displayed by the mechanical device is selected from the group consisting of: multipliers; bonus games; free game activations; credit values; and combinations thereof.

16. The gaming device of claim 1, wherein the mechanical device is a wheel.

17. A gaming device comprising:

a housing;

a display device mounted in said housing and controlled by a processor;

a plurality of selections displayed by said display device;

a terminator associated with at least one of said plurality of selections;

a selector in communication with said processor for enabling a player to pick said selections until picking a selection revealing said terminator;

a plurality of awards associated with said plurality of selections, wherein each award associated with a selection provides said player a preliminary bonus award;

a mechanical device connected to said housing and controlled by said processor, said mechanical device activated by said processor after said player's selection reveals a terminator; and a plurality of modifiers associated with said mechanical device, wherein said processor is adapted to utilize said mechanical device to selectively display at least one of said modifiers to said player and adapted to apply said displayed modifier to said preliminary bonus award to determine said player's final bonus award.

18. The gaming device of claim 17, which includes an award provided to the player associated with the selection having the terminator.

19. The gaming device of claim 17, wherein the processor activates said mechanical device if said player's preliminary bonus award is less than a maximum award.

20. The gaming device of claim 17, wherein the processor activates said mechanical device if said player's preliminary bonus award is greater than a minimum award.

21. The gaming device of claim 17, wherein the processor, after the selection of said terminator, activates said mechanical device if the number of selections said player picked prior to picking a selection revealing a terminator is less than a maximum number of picks.

22. The gaming device of claim 17, wherein the processor, after the selection of said terminator, activates said mechanical device if the number of selections said player picked prior to picking a selection revealing a terminator is greater than a minimum number of picks.

23. The gaming device of claim 17, wherein said plurality of awards associated with said plurality of selections are randomly determined by said processor.

24. The gaming device of claim 17, wherein said mechanical device randomly selects one of said plurality of modifiers to display to said player.

25. The gaming device of claim 17, which includes at least one terminator associated with one selection, whereupon the player's pick of said selection causes said processor to activate said mechanical device at least twice and display a modifier to the player for each activation.

26. The gaming device of claim 25, wherein said processor applies each displayed modifier to said preliminary bonus award to determine said player's final bonus award.

27. A gaming device comprising:

a housing;

a display device mounted in said housing and controlled by a processor;

a bonus game having a plurality of selections displayed by said display device;

a number of picks provided by said processor to a player for picking said plurality of selections;

a plurality of awards associated with said number of picks;

a terminator associated with one of said selections;

a selector in communication with said processor for enabling a player to pick said selections until using all of said player's picks or picking a selection with said terminator;

a mechanical device connected to said housing and controlled by said processor, said mechanical device activated by said processor after said player uses said player's last pick or picks a selection having said terminator; and a plurality of modifiers, wherein said mechanical device is adapted to display one of said plurality of modifiers to said player.

28. The gaming device of claim 27, wherein the player's number of picks is randomly determined by said processor.

29. The gaming device of claim 27, wherein the displayed modifier is adapted to modify a plurality of said awards associated with said number of picks.

* * * * *

UNITED STATES PATENT AND TRADEMARK OFFICE

CERTIFICATE OF CORRECTION

PATENT NO. : 6,582,307 B2 Page 1 of 1
DATED : June 24, 2003
INVENTOR(S) : Bayard S. Webb It is certified that error appears in the above-identified patent and that said Letters Patent is hereby corrected as shown below:

Column 6,
Line 64, change “e.g., adjacent reels 34 but” to -- adjacent reels 34, for example, but --.
Line 66, change “three times or” to -- three times, or --.

Column 7,
Lines 66-67, change “processor simultaneously” to -- with processor, simultaneous to --.

Column 8,
Line 1, change “thereafter activates” to -- thereafter, activates --.
Line 7, change “device after” to -- device, after --.
Line 8, change “function displays” to -- function, displays --.

Signed and Sealed this

Eighteenth Day of November, 2003

JAMES E. ROGAN
*Director of the United States Patent and Trademark Office*